(12) United States Patent
Wilson et al.

(10) Patent No.: US 7,756,338 B2
(45) Date of Patent: Jul. 13, 2010

(54) METHOD FOR DETECTING SCENE BOUNDARIES IN GENRE INDEPENDENT VIDEOS

(75) Inventors: Kevin W. Wilson, Cambridge, MA (US); Ajay Divakaran, Woburn, MA (US); Feng Niu, Miami, FL (US); Naveen Goela, Cambridge, MA (US); Isao Otsuka, Nagaokakyo (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 820 days.

(21) Appl. No.: 11/674,750

(22) Filed: Feb. 14, 2007

(65) Prior Publication Data

US 2008/0193017 A1    Aug. 14, 2008

(51) Int. Cl.
*G06K 9/46*    (2006.01)
*G06K 9/66*    (2006.01)

(52) U.S. Cl. ................. 382/190; 382/224; 348/135; 348/699; 348/700

(58) Field of Classification Search ................. 382/190, 382/199, 224, 225, 226, 227, 228, 236; 348/135, 348/699, 700; 345/728; 715/723; 725/45
See application file for complete search history.

(56) References Cited

U.S. PATENT DOCUMENTS

| 6,961,446 | B2* | 11/2005 | Imagawa et al. | 382/103 |
| 7,382,933 | B2* | 6/2008 | Dorai et al. | 382/276 |
| 2004/0078188 | A1* | 4/2004 | Gibbon et al. | 704/1 |
| 2005/0238238 | A1* | 10/2005 | Xu et al. | 382/224 |
| 2007/0101269 | A1* | 5/2007 | Hua et al. | 715/723 |

* cited by examiner

*Primary Examiner*—John B Strege
(74) *Attorney, Agent, or Firm*—Dirk Brinkman; Gene Vinokur

(57) ABSTRACT

A computer implemented method detects scene boundaries in videos by first extracting feature vectors from videos of different genres. The feature vectors are then classified as scene boundaries using a support vector machine. The support vector machine is trained to be independent of the different genres of the videos.

10 Claims, 3 Drawing Sheets

METHOD FOR DETECTING SCENE BOUNDARIES IN GENRE INDEPENDENT VIDEOS

FIELD OF THE INVENTION

This invention relates generally to detecting scene boundaries in videos, and more particularly to detecting scene boundaries using audio and visual features.

BACKGROUND OF THE INVENTION

In videos (and movies), shot and scene boundaries provide a structure that can be useful for understanding, organizing, and browsing the videos.

A shot boundary occurs when the shutter opens, and another shot boundary occurs when the shutter closes. Thus, a shot is a continuous, uninterrupted sequence of frames. Generally, shots for drama, action, and situation comedies are in the order of a few seconds.

As defined herein, a scene is a semantically meaningful or cohesive sequence of frames. Scenes generally last several minutes. For example, a common scene includes actors talking to each other. The camera(s) usually present the scene as several close-up shots, where each actor is shown in turn, either listening or talking, and occasionally a shot will show all actors in the scene at a middle or far distance.

Detecting scene boundaries is challenging because scene boundaries for different genres, and even scene boundaries within one genre, do not necessarily have any obvious similarities.

Scene boundaries in scripted and unscripted videos can be detected by low-level visual features, such as image differences and motion vectors, as well as differences in distributions of audio features. Usually, after a feature extraction step, a comparison with a set threshold is required, see Jiang et al., "Video segmentation with the support of audio segmentation and classification," Proc. IEEE ICME, 2000, Lu et al., "Video summarization by video structure analysis and graph optimization," Proc. IEEE ICME, 2004, Sundaram et al., "Video scene segmentation using video and audio features," Proc. IEEE ICME, 2000, and Sundaram et al., "Audio scene segmentation using multiple models, features and time scales," IEEE ICASSP, 2000. All of the above techniques are genre specific. This means the detector is trained for a particular genre of video, and will not work for other genres. It is desired to provide a scene detector that will work for any genre of video.

Detecting semantic scene boundaries is challenging due to several factors including: lack of training data; difficulty in defining scene boundaries across diverse genres; absence of a systematic method to characterize and compare performance of different features; and difficulty in determining thresholds in hand-tuned systems.

SUMMARY OF THE INVENTION

The embodiments of the invention provide a method for detecting scene boundaries in genre independent videos. The method extracts visual and audio features that can be used to detect scene boundaries independent of the genre of the content of the videos.

The invention provides a genre-independent support vector machine (SVM) for detecting scene boundaries in videos. The SVM works on content from a diverse range of genres by allowing sets of features extracted from both audio and video streams to be combined and compared automatically without the use of explicit thresholds. For a ground truth, we use labeled scene boundaries from a wide variety of video genres to generate positive and negative samples for training the SVM.

DETAILED DESCRIPTION OF THE PREFERRED EMBODIMENTS

Detecting Scene Boundaries

Figure 1:
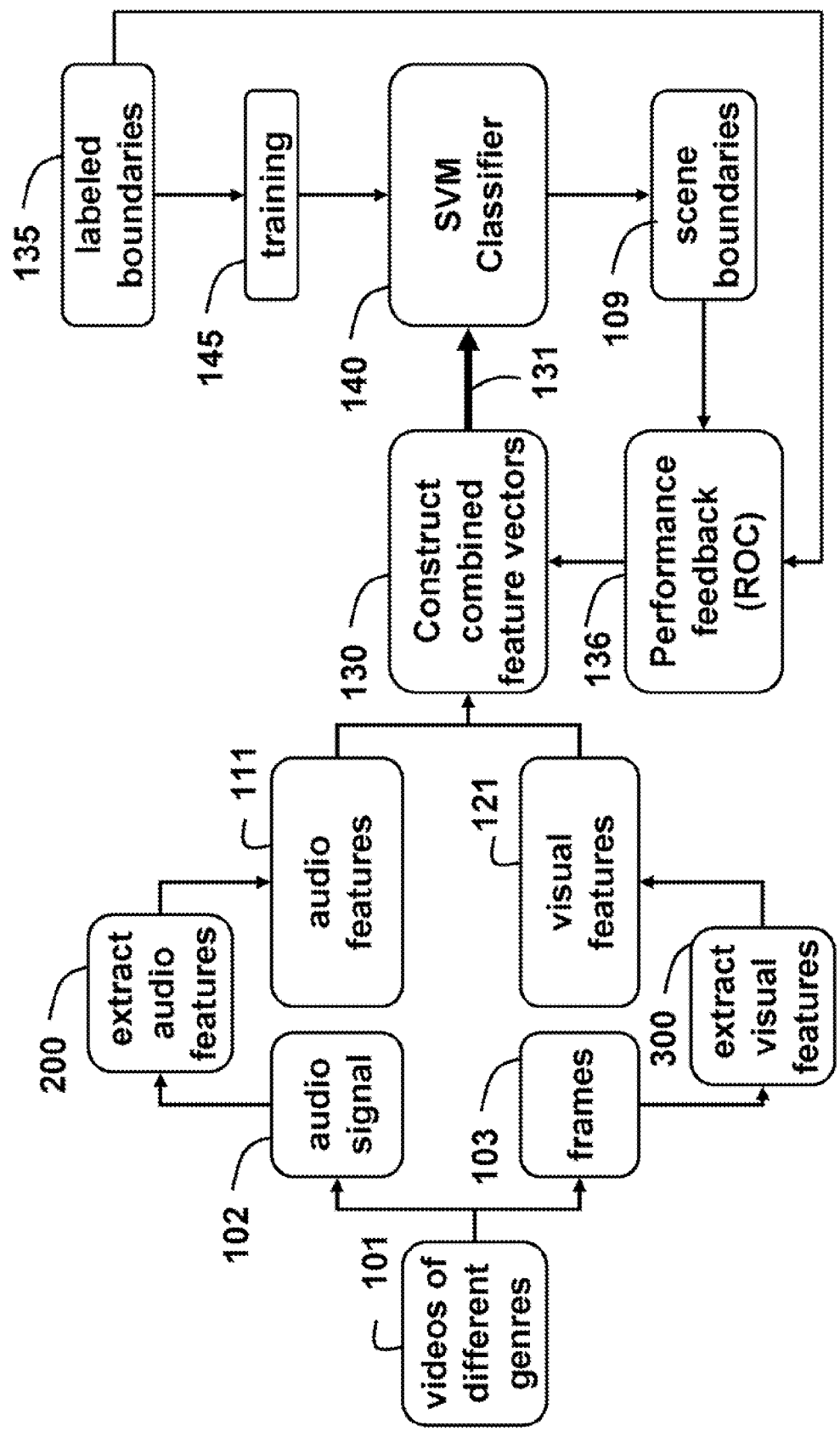
FIG. 1 is a flow diagram of a method for detecting scene boundaries in a video according to an embodiment of the invention.

FIG. 1 shows a method for detecting scene boundaries in genre independent videos according to an embodiment of our invention. Input to our method is an audio-visual stream 101. The audio-visual stream 101 includes an audio signal 102 and a visual signal in the form of a sequence of frames 103. Audio features 111 are extracted 200 from the audio signal 102, and visual features 121 are extracted 300 from the frames 103 of the videos 101. The audio and visual features are combined 130 to construct feature vectors 131. The feature vectors are processed by support vector machine (SVM) 140 to detect scene boundaries 109. The scene boundaries can be used by video segmentation, indexing and browsing applications. Feedback 136, in the form of receiver operator curves (ROC) 136, can be used to measure performance and to design better input vectors based on available feature streams.

Support Vector Machine

More particularly, we use a discriminative Gaussian-Kernel SVM, see Hastie et al., incorporated herein by reference, "The Elements of Statistical Learning: Data Mining, Inference, and Prediction," Springer, August 2001. The SVM is a binary classifier for detecting scene boundaries. The SVM uses a hyperplane to maximize the separation between data belonging to two distinct classes.

Training

During a training phase 145, the classifier 140 is trained with training vectors 135 for scene boundaries, as well as non-scene boundaries. That is the training vectors are labeled. The training determines an optimal, and possibly non-linear, decision boundary for separating the combined feature vectors 131.

One goal is to determine the features that can distinguish scene boundaries from non-scene boundaries in diverse video content. In other words, our scene detector is not genre dependent. Another goal is that the feature vectors 131 have a relatively low-dimensionality. Furthermore, we would like our features to be readily available, and computationally efficient.

Audio Features

Figure 2:
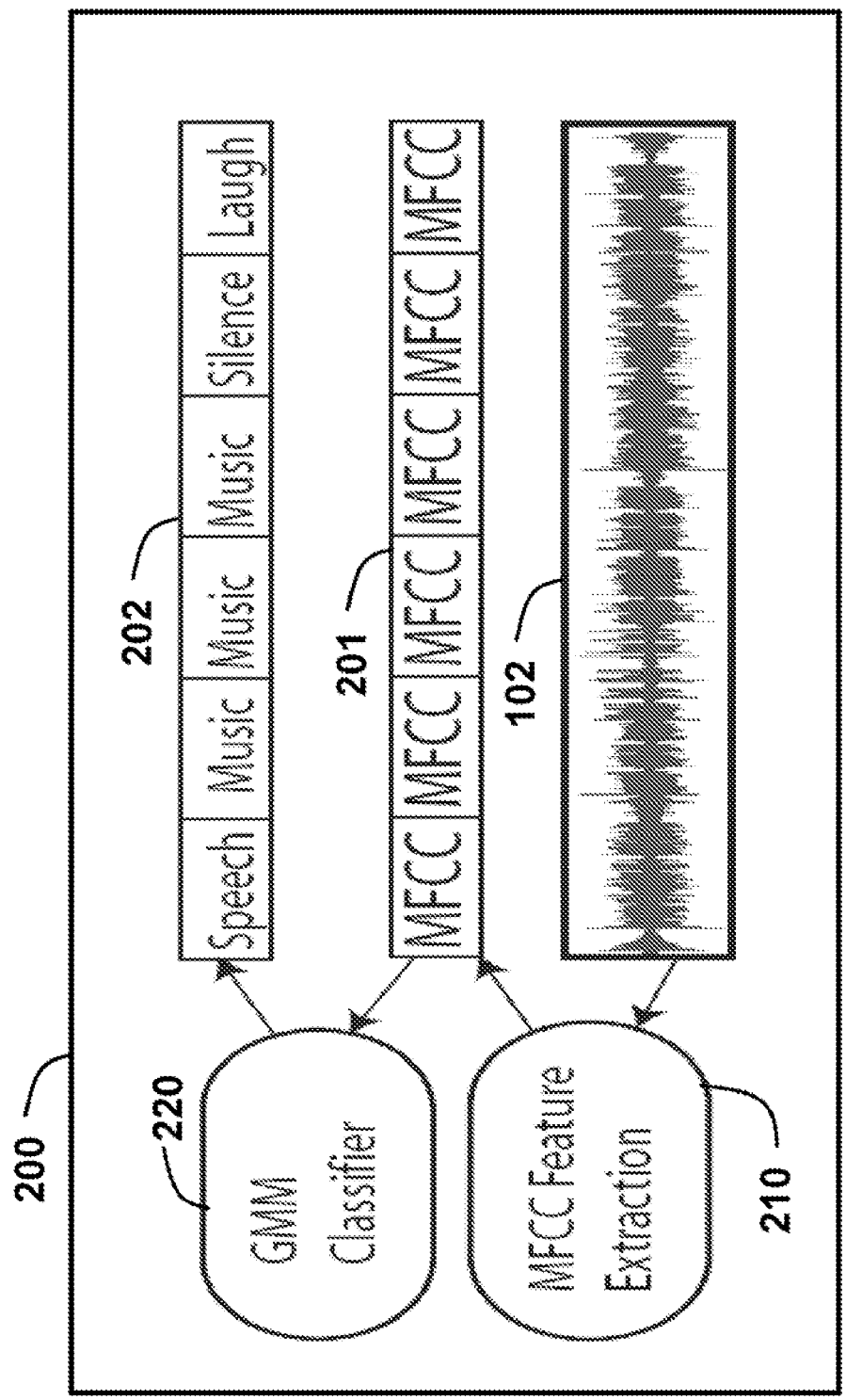
FIG. 2 is a schematic of extracting audio features according to an embodiment of the invention.

As shown in FIG. 2, we sample the audio signal 102 at 44.1 KHz, and extract 210 twelve Mel-frequency cepstral coefficients (MFCCs) 201 from 20 ms audio frames. Based on the MFCC features 201, we classify 220 each second of the audio signal into one of four semantic classes: music, speech, laughter, silence. Note, that other semantic classes could be used. The speech can be further classified as male or female. For the audio classification 220, we use maximum likelihood (ML) estimation over Gaussian mixture models (GMMs), see U.S. patent application Ser. No. 11/593,897, "Method and System for Video Segmentation" filed by Divakaran et al. on Nov. 7, 2006, incorporated herein by reference. The GMMs for each semantic class are estimated from audio training data. These semantic classes help us to detect, for example, a brief passage of music that typically accompanies scene boundaries in some content, or the laughter that often comes at the end of a scene in a situation comedy.

Visual Features

Figure 3:
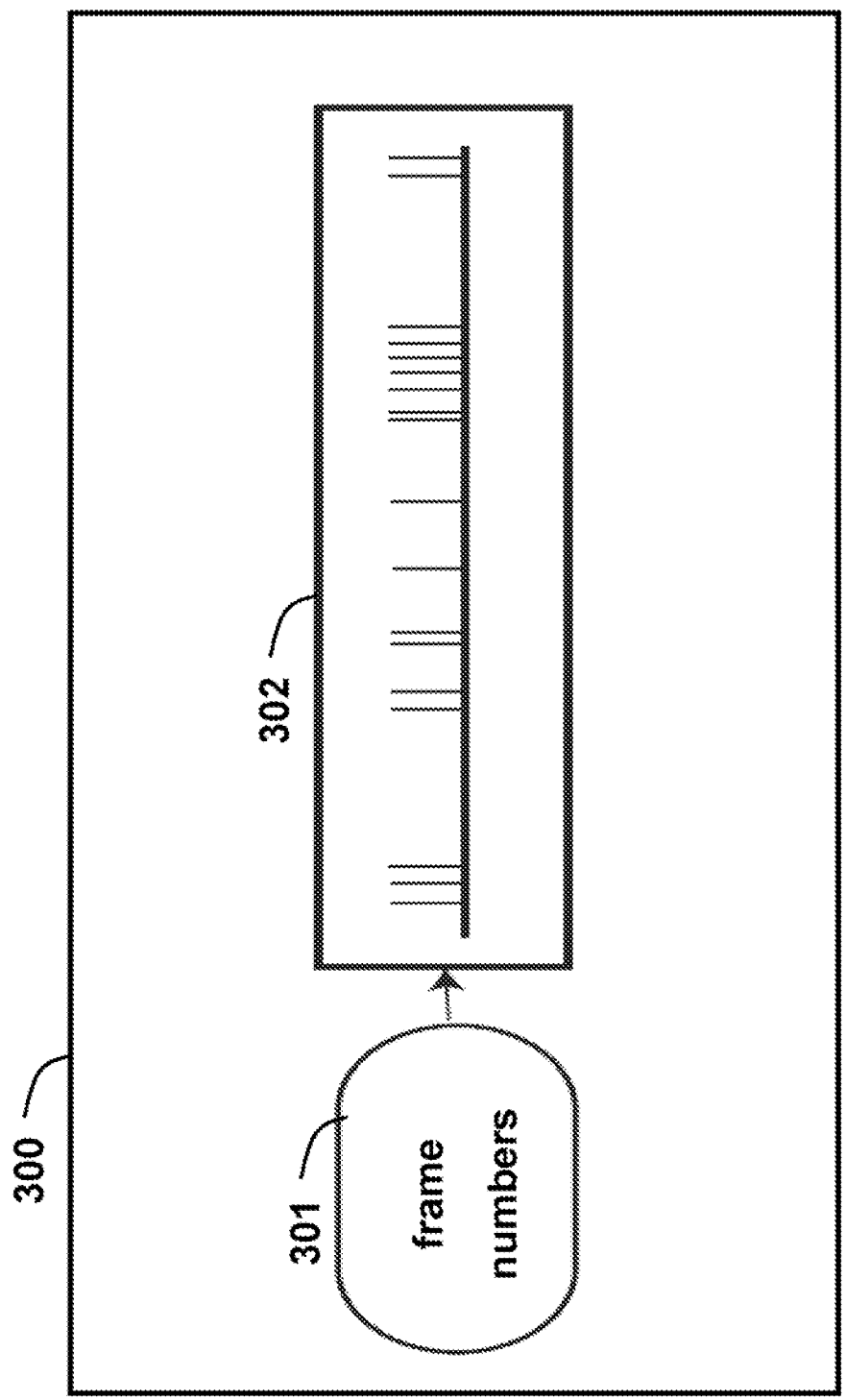
FIG. 3 is a schematic of extracting visual features according to an embodiment of the invention.

As shown in FIG. 3, we record the frame number 301 for each frame, and determine which frame numbers correspond to shot boundaries 302, see Lienhart, "Comparison of automatic shot boundary detection algorithms," SPIE Vol. 3656, pp. 290-301, 1998, incorporated herein by reference. It is also possible to use motion vectors, image differences and color histograms, at the pixel level, for the visual features 121.

The feature vectors 131 for the SVM 140 are defined for scene(+) and non-scene(−) boundaries as $$X_i = \{x_1, x_2, x_3, \ldots, x_{11}, x_{12}\},$$

i.e., our features have twelve dimensions. The input vectors $X_i$ describe local information about a particular time position t (in seconds) within the video. Note the time can be determined directly from the frame numbers, given the frame rate, e.g., ~30 frames per second. For the training 145, we determine the vector $X_i$ at the hand labeled time positions for scenes(+) and randomly generated non-scenes(−).

The first nine elements of the vector $X_i$ are histograms of semantic labels. The next two components represent a difference between the audio distribution before and after a particular time t, and the last component is based on the video shot boundaries 302. The components are defined as follows:

Pre-Histogram: Variables $x_1, x_2, x_3$.

The pre-histogram indicates the number of semantic labels in the set of classes {music, speech, laughter, silence} within a time window of duration $[t-W_L, t]$, where $W_L$ is a selected window size. The histogram is normalized to sum to 1. We can discard one dimension from the 4D histogram because it is fully determined by the remaining three histogram values.

Mid-Histogram: Variables $x_4, x_5, x_6$.

The mid-histogram variables are similar to the pre-histogram and indicate semantic labels within a window of duration $$\left[t - \frac{W_L}{2}, t + \frac{W_L}{2}\right].$$

Post-Histogram: Variables $x_7, x_8, x_9$.

The post-histogram indicates labels within a window $[t, t+W_L]$.

Bhattacharyya Shape and Distance: Variables $x_{10}, x_{11}$.

We determine a Bhattacharyya shape and a Mahalanobis distance between single Gaussian models estimated from the low level MFCCs for the window $[t-W_L, t]$ and window $[t, t+W_L]$. The Bhattacharyya shape is $$D_{shape} = \frac{1}{2} \ln \frac{\left|\frac{C_i + C_j}{2}\right|}{|C_i|^{\frac{1}{2}} |C_j|^{\frac{1}{2}}}, \text{ and} \tag{1}$$

the Mahalanobis distance is $$D_{mahal} = \frac{1}{8}(\mu_i - \mu_j)^T \left(\frac{C_i + C_j}{2}\right)^{-1} (\mu_i - \mu_j), \tag{2}$$

The covariance matrices $C_i$ and $C_j$, and the means $\mu_i$ and $\mu_j$ represent the diagonal covariances and the mean of the MFCC vectors before and after a time position t. The Bhattacharyya shape and the Mahalanobis distance are sensitive to changes in the distributions of the MFCCs. Therefore, these features provide much low-level cues about changes in the video.

For example, a scene change accompanied by a change from a male speaker to a female speaker would generate a large MFCC Mahalanobis distance, even though the semantic histograms would show that both scenes contained primarily speech.

Average Shot Count: Variables $x_{12}$.

The final element is twice the average number of shot boundaries present in the video within a window $[t-W_L, t+W_L]$.

Because we use a kernel-based SVM with a smoothing bandwidth, which is equal along all dimensions, we ensure that all of the variables in the vector $X_i$ 131 have approximately the same variance. An optimal window length of $W_L=14$ seconds provides enough data to estimate the Bhattacharyya distances and semantic histograms.

SVM Classifier

The SVM is a supervised learning procedure that attempts to find a maximum margin hyperplane separating two classes of data, scenes and non-scenes. Given data points $\{X_0, X_1, \ldots, X_N\}$ and class labels $\{y_0, y_1, \ldots, y_N\}$, $y_i \in \{-1, 1\}$, the SVM constructs a decision boundary for the two classes that generalizes well. For this reason, the SVM is typically used as a classifier in complex, noisy applications. In our case, the two classes are scene(+) and non-scene(−) boundaries. The data points $X_i$ are the 12D vectors described above. Methods for constructing SVM-based classification models are well known.

One advantage of the SVM is that the input vector X can be transformed to a higher dimensional feature space via a kernel function. The data may be linearly separable in this space by a hyperplane that is actually a non-linear boundary in the original input space. In our implementation, we use radial basis kernel:

$$K(X_i, X_j) = e^{-\gamma D^2(X_i, X_j)} \tag{3}$$

We use the Euclidean $L_2$ distance D between the feature vectors X 131, although other distance functions are also possible. We fix the value of the kernel bandwidth to $\gamma=2.0$, but could adjust this value for less smoothing when additional training data are available. With a limited number of training samples, we would like a smooth boundary to account for noise. Noise is introduced in various ways such as inaccuracies in the audio or visual features, e.g., misclassified semantic labels, missed/false shot boundaries, alignment of streams, and in incorrect hand-labeled boundaries.

Due to the difficulty in collecting a large amount of scene boundaries, most prior art techniques have not focused on supervised learning for scene detection. However, casting the scene detection problem as a classification problem has the advantage that we eliminate the need for explicit thresholds for variables because the decision boundaries are tuned by the SVM 140. Furthermore, we are able to compare various combinations of features quickly, based on their performance against the training data. The SVM provides a unifying framework for jointly modeling separate features. This enables us to add features as necessary to accommodate diverse genre independent video content.

EFFECT OF THE INVENTION

The embodiment of the invention provide an SVM kernel-based classifier for detecting scene boundaries in a wide class of videos as situation comedies, news programs, dramas, how-to video, music videos, and talk shows. In other words our scene detection is genre independent.

By detecting scene boundaries, we can improve the video-browsing capabilities of consumer electronics devices to enable users to more quickly and effectively mange video content. Thus, by a "scene change" we mean a semantically meaningful change, which may or may not have an obvious manifestation in the video and/or audio signals.

Furthermore, by our definition "scene changes" occur every few minutes, which we believe is a useful granularity for video content browsing. Our work depends on a hand-labeled ground truth, so the operational definition of a scene change depends on the opinion of the human who located scene changes in our training videos. In situation comedies and dramas, scene changes typically correspond to changes in filming location or to the entrance of a significant new character. For news, scene changes correspond to boundaries between news stories. For talk shows, scene changes correspond to changes from on guest or skit to another. Similar decisions are made for other genres of videos.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computer implemented method for detecting scene boundaries in videos, comprising the steps of:
    extracting audio features from an audio signal of the videos, wherein the audio features are Mel-frequency cepstral coefficients, and the audio signals are classified into semantic classes, and wherein each feature vector includes variable $x_1$, $x_2$, $x_3$ indicating a number of the audio classes labels within a time window of duration $[t-W_L, t]$, where $W_L$ is about fourteen seconds, and variables $x_4$, $x_5$, $x_6$ indicating a number of the audio classes in a window of duration $$\left[t - \frac{W_L}{2}, t + \frac{W_L}{2}\right],$$

and variables $x_7$, $x_8$, $x_9$ indicate a number of audio classes within a window $[t, t+W_L]$, and variables $x_{10}$, $x_{11}$ are a Bhattacharyya shape and a Mahalanobis distance between the MFCC coefficients for the window $[t-W_L, t]$ and window $[t, t+W_L]$, respectively, and variable $x_{12}$ is twice an average number of shot boundaries present in the video within a window $[t-W_L, t+W_L]$;
    extracting visual features from frames of the videos;
    combining the audio and visual features into the feature vectors,
    extracting the feature vectors from videos of different genres;
    classifying the feature vectors as scene boundaries using a support vector machine, and in which the support vector machine is trained to be independent of the different genre of the videos; and
    segmenting the videos according to the scene boundaries, wherein the steps are performed in a computer.

2. The method of claim 1, in which the videos are compressed.

3. The method of claim 1, further comprising:
    feeding back results of the classifying to improve the feature extracting.

4. The method of claim 1, further comprising:
    labeling the scene boundaries in training videos to train the support vector machine.

5. The method of claim 1, in which the semantic classes include music, speech, laughter, and silence.

6. The method of claim 5, in which the speech includes male and female speech.

7. The method of claim 1, in which the visual features include shot boundaries.

8. The method of claim 1, in which the Bhattacharyya shape is $$D_{shape} = \frac{1}{2} \ln \frac{\left|\frac{C_i + C_j}{2}\right|}{|C_i|^{\frac{1}{2}} |C_j|^{\frac{1}{2}}},$$

and
the Mahalanobis distance is $$D_{mahal} = \frac{1}{8}(\mu_i - \mu_j)^T \left(\frac{C_i + C_j}{2}\right)^{-1} (\mu_i - \mu_j),$$

where covariance matrices $C_i$ and $C_j$, and means $\mu_i$ and $\mu_j$ represent diagonal covariances and means of the MFCC vectors before and after the time t.

9. The method of claim 1, further comprising:
    transforming the feature vectors to a higher dimensional feature space using a kernel function.

10. The method of claim 9, in which the kernel function is a radial basis kernel.

* * * * *